United States Patent [19]
Tuckey

[11] Patent Number: 5,579,802
[45] Date of Patent: Dec. 3, 1996

[54] FUEL TANK VAPOR CONTROL APPARATUS

[75] Inventor: Charles H. Tuckey, Cass City, Mich.

[73] Assignee: Walbro Corporation, Cass City, Mich.

[21] Appl. No.: 547,434

[22] Filed: Oct. 24, 1995

[51] Int. Cl.$^6$ ............................ F16K 24/04; F16K 31/18
[52] U.S. Cl. ................................................ 137/202; 137/43
[58] Field of Search .......................... 137/43, 202; 251/39

[56] References Cited

U.S. PATENT DOCUMENTS

| | | | |
|---|---|---|---|
| 2,554,158 | 5/1951 | Spence | 251/39 |
| 4,011,884 | 3/1977 | Drori | 137/202 |
| 4,753,262 | 6/1988 | Bergsma | 137/39 |
| 5,065,782 | 11/1991 | Szlaga | 137/202 X |
| 5,234,013 | 8/1993 | Roetker et al. | 137/202 X |

Primary Examiner—Gerald A. Michalsky
Attorney, Agent, or Firm—Barnes, Kisselle, Raisch, Choate, Whittemore & Hulbert

[57] ABSTRACT

An apparatus to control the flow of hydrocarbon fuel vapor from a vehicle fuel tank. The apparatus is mounted adjacent the top of the fuel tank and contains a valve system which controls fuel vapor flow from the tank to a receiving canister and prevents the vapor from escaping to the atmosphere. The valve system utilizes a diaphragm, operably connected to a main valve, to prevent the vapor pressure in the fuel tank from closing the valve. The main valve is actuated by a float responsive to the level of fuel in the tank and remains open when the fuel level is below a designated level and closes due to a sufficiently high fuel level or in a vehicle roll-over condition to prevent liquid fuel from escaping from the fuel tank through the apparatus.

22 Claims, 1 Drawing Sheet

FUEL TANK VAPOR CONTROL APPARATUS

FIELD OF THE INVENTION

This invention relates to vehicle fuel tanks and more particularly to a valve assembly for controlling the flow of fuel vapor from a vehicle fuel tank.

BACKGROUND OF THE INVENTION

Regulations for preventing the escape of volatile hydrocarbon fuel vapors to the atmosphere are being promulgated by governmental agencies. One source of hydrocarbon fuel vapors is the fuel tanks of vehicles using gasoline or other hydrocarbon fuels of high volatility. With current automotive fuel tank designs, fuel vapor can escape during the filling of the tanks and usually even after the tank is filled.

The use of an on-board vapor recovery system to remove excess fuel vapor from the fuel tank is one solution to this problem. Typically a canister with activated charcoal therein receives fuel vapors through a control unit mounted in the top of the fuel tank and communicates with the intake manifold of the vehicle engine for exhausting fuel vapor from the canister during operation of the engine. The control unit usually has a valve responsive to the level of fuel in the tank that enables the valve to stay open at a sufficiently low fuel level to permit fuel vapors to flow freely from the tank into the canister. As the fuel level rises during filling to approach a desired maximum level of fuel in the tank, a float is raised to close the valve to prevent liquid fuel from flowing through the valve and into the vapor receiving canister.

Some of these systems use a high capacity or high flow rate valve to control the flow of vapor from the fuel tank to the vapor storage canister. Current high capacity or high flow rate valve designs tend to be forced into and held in a closed position, when they should be open, by the vapor pressure in the fuel tank. This prevents the vapor from flowing through the valve and into the vapor storage canister. Thus, the purpose of the system is defeated because the vapor is not allowed to pass through the valve and into the storage canister, and then may be even discharged to the atmosphere.

SUMMARY OF THE INVENTION

A high flow rate vapor control valve assembly with a main flow control valve connected to a diaphragm for balancing and canceling out the affect of any pressure differential across the main valve on the opening of the main valve. A pilot valve communicates with the one side diaphragm preferably through a passage in a rigid stem interconnecting the main valve and the diaphragm for transmitting the force produced by the diaphragm to the main valve. Preferably, both the main valve and the pilot valve are opened and closed by a single float responsive to the level of liquid fuel in the fuel tank.

Objects, features and advantages of this invention include a fuel tank vapor control valve assembly which has a high flow rate or capacity, opens and closes in response to the level of fuel in the tank without being adversely affected by the pressure of fuel vapor in the tank, prevents a vapor receiving canister from receiving liquid fuel, closes in a vehicle roll-over condition, maintains a fuel tank vapor dome, provides fuel tank over pressure relief, and is rugged, durable, reliable, and of relatively simple design and economical manufacture and assembly, and has a long useful life in service.

BRIEF DESCRIPTION OF THE DRAWINGS

These and other objects, features and advantages of this invention will be apparent from the following detailed description of the preferred embodiment and the best mode presently contemplated for this invention, appended claims and accompanying drawings in which:

DETAILED DESCRIPTION OF THE PREFERRED EMBODIMENT

Figure 1:
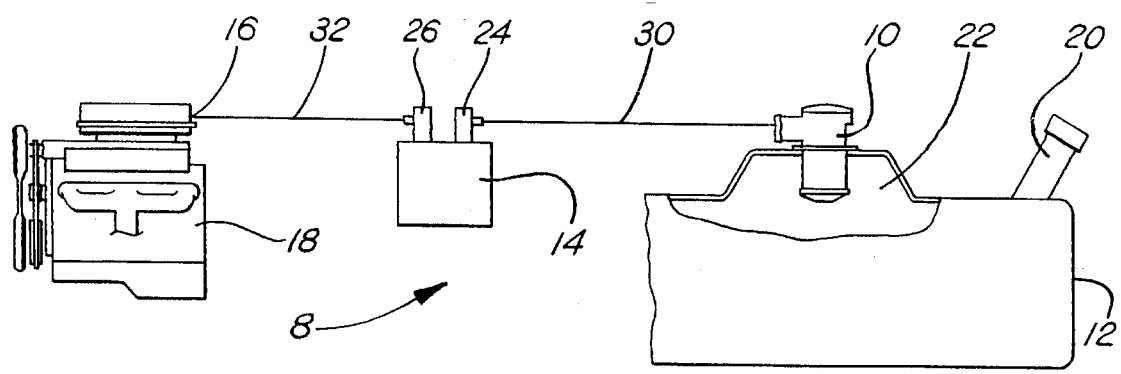
FIG. 1 is a semi-diagrammatic view of a vehicle fuel system illustrating the vehicle engine, vapor recovery canister, fuel tank, and a control unit embodying this invention.

FIG. 1 diagrammatically illustrates an automotive vehicle with an on-board vapor recovery system 8 with a control unit 10 embodying this invention mounted in the top of a fuel tank 12 and connected to a fuel vapor storage canister 14. The canister 14 is connected to the intake manifold 16 of an internal combustion engine 18. The tank 12 is filled with a volatile liquid hydrocarbon fuel through a fill pipe 20 or tube with an inlet disposed vertically above the top of the tank 12 and typically received in an access pocket of the vehicle. Preferably, a raised area in the top wall of the tank 12 provides a well defined vapor dome 22.

Typically, the canister 14 is filled with activated charcoal (preferably grade 15) to absorb the hydrocarbon vapors received from the control unit 10 through an inlet port 24 and to discharge the vapor through an outlet or purge port 26 into the intake manifold 16 of the engine 18. The interior of the canister 14 is vented to the atmosphere through a port in the top of the canister (not shown). The canister 14 may be mounted in the vehicle a few feet from the gas tank 12 and is connected to the control unit 10 and the intake manifold 16 by suitable flexible hoses 30, 32.

Figure 2:
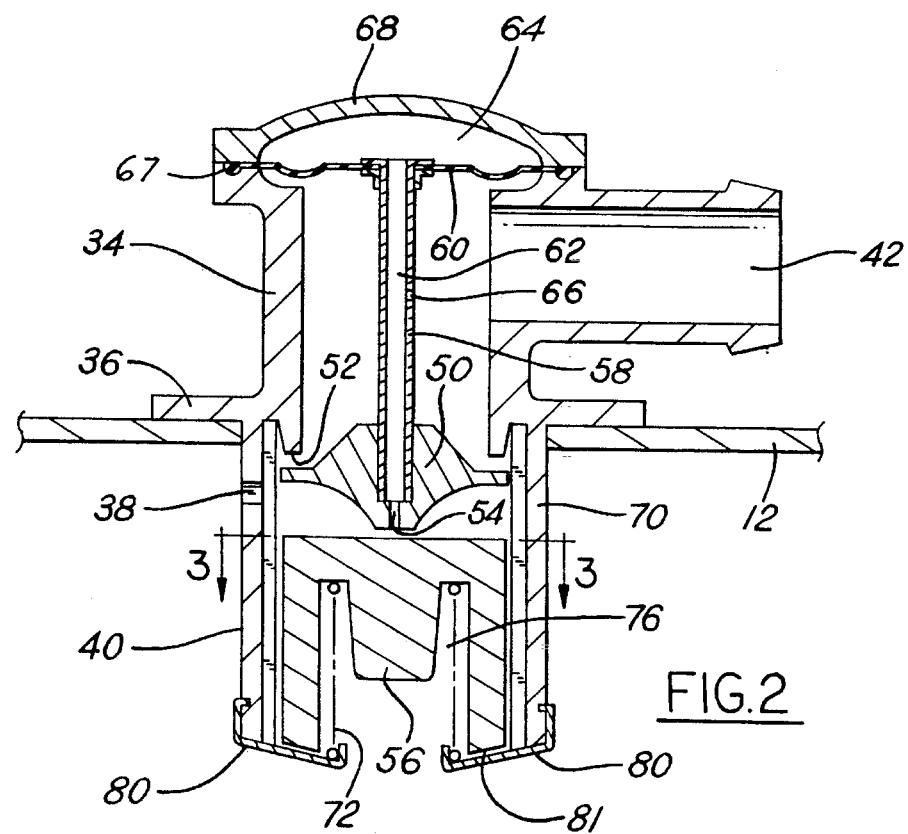
FIG. 2 is a full sectional view of the control unit of FIG. 1.

As shown in FIG. 2, the control unit 10 has a generally cylindrical housing 34 with a peripheral flange 36 which, in assembly, overlies and is sealed to the top of the fuel tank 12. To allow fuel vapor to flow into the control unit 10 from the fuel tank vapor dome 22, the control unit 10 has one or more has openings or vapor passages 38 in its side wall 40 located adjacent and below the top of the fuel tank 12. To allow the fuel vapor to flow from the control unit 10 to the vapor receiving canister 14, preferably the control unit 10 has an outlet passage 42 constructed to be in communication with the vapor receiving canister 14.

The control unit 10 has a valve system which controls the flow of the fuel vapor from the fuel tank 12 to the vapor canister 14. The valve system has a main valve 50 that closes on a seat 52 in the housing of the control unit 34. Preferably, to prevent liquid fuel from entering the control unit 10 above the main valve 50 and flowing into the vapor canister 14, the seat 52 and main valve 50 are located above the vapor passages 38 in the side wall of the housing 40. The main valve 50 has a pilot valve 54 which is sealingly engagable with a float 56 located beneath the main valve 50.

A hollow rigid stem 58 is connected to the main valve 50 and to a diaphragm 60 located near the top of the control unit 10. The stem 58 has a passage 62 therethrough which communicates with a chamber 64 defined above the diaphragm 60 and the pilot valve 54 carried by the main valve 50. The stem 58 also has a small opening 66 in its sidewall that acts as a pressure "bleed-off" to allow vapor in the chamber 64 to slowly escape when the pilot valve 54 is closed.

The diaphragm 60 has a peripheral rib 67 which is received between and sealed to a top plate 68 or cap and the housing of the control unit 34. The center of the diaphragm 60 is axially displacable in response to the vapor pressure acting on the diaphragm 60. The stem 58 rigidly connects the center of the diaphragm 60 to the main valve 50 so that movement of the diaphragm causes a corresponding movement of the main valve 50, and vice versa.

When the pilot valve 54 is open the diaphragm chamber 64 is in communication with the vapor of the interior of the fuel tank 12. To balance the force of the vapor pressure in the tank that tends to move the main valve 50 upward into a closed position, the vapor pressure in the diaphragm chamber 64 creates a downward force on the diaphragm 60. This downward force may be equal to or greater than the upward force of the vapor pressure on the main valve 50 and tends to prevent upward displacement of the diaphragm 60, holding the main valve 50 in an open position. Thus, while the pilot valve is open these opposing forces counteract, balance or cancel each other. The magnitude of each force will be a function of the effective surface areas of the diaphragm 60 and the main valve 50 and if these areas are equal the opposing forces will cancel out or be balanced.

Figure 3:
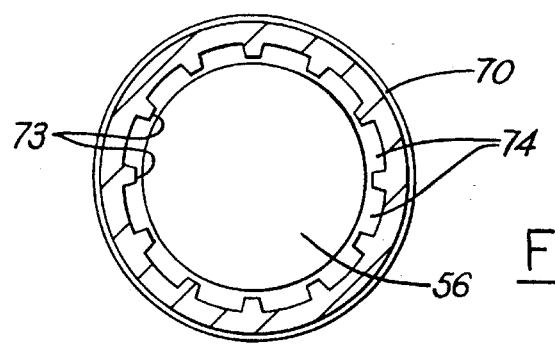
FIG. 3 is a sectional view taken along line 3—3 of FIG. 2.

The float 56 has a generally cylindrical outside diameter and is slidably received for reciprocation in a depending annular skirt 70 of the housing 34 and yieldably biased upwardly by a coil spring 72 received between them. As shown in FIG. 3, to minimize sliding friction between the skirt 70 and the float 56, the annular skirt has a plurality of longitudinal lands 73 and recesses or grooves 74 circumferentially spaced apart about its inside perimeter. As shown in FIG. 2, for receiving the coil spring 72 the bottom of the float 56 has a blind annular recess 76 therein.

To retard liquid fuel, particularly when sloshing in the tank, from being forced past the float 56 and through the open valve 50 into the canister, the float has a relatively close sliding fit with the lands 73, the recesses 74 are relatively shallow and the recess 76, which is preferably conical, directs the fuel toward the center of the float and away from its sidewall. If the sloshing fuel has sufficient force it rapidly closes the main valve. To further reduce the possibility of liquid fuel, particularly when sloshing in the tank, from being forced past the float and through the open main valve 50, an annular retainer ring 80 underlies the bottom of the skirt 70, the float 56, and the space and grooves 74 between them. The retainer 80 also retains the lower end of the spring 72 and has a central opening through which liquid fuel passes to actuate the float. Preferably to further retard liquid fuel from being forced past the float 56 its bottom face 81 sits on and seals with the retainer when the float is not immersed in liquid fuel.

To insure that in any vehicle roll-over condition the float 56 rapidly closes the main valve 50 and that it remains closed even if the float 56 is completely submerged in liquid fuel, preferably the float has a specific gravity greater than that of the liquid fuel with which it is utilized. Typically, the liquid fuel has a specific gravity of about 0.6 to 0.8 and the float has a specific gravity in the range of about 0.9 to 1.4 and preferably about 1.0 to 1.1. Preferably the float 56 is made of a nonporous dense plastic material that is highly resistant to degradation by contact with hydrocarbon fuels such as gasoline, gasahol and diesel fuel, such as an acetal copolymer having a density of about 1 gram per cubic centimeter. When the vehicle is in its normal upright position, the force produced by the spring 76 must be small enough so that the main valve 50 will remain open when the float 56 is not disposed in any liquid fuel and yet large enough so that the force produced by the spring plus the buoyancy force of the float when it is partially immersed in liquid fuel will be sufficient to close both the pilot valve 54 and the main valve 50.

When the unit is in its normal upright position, the force produced by the spring 72 must be less than the force of gravity acting on the float 56, the valve assembly 50, stem 58 and diaphragm 60 when the float is not disposed in any liquid fuel so that the valve assembly 50 will be in its open position. Preferably, the force produced by the spring is less than the force of gravity acting on the float 56 alone so that both the main valve 50 and pilot valve 54 will be open in the normal upright position when the float is not in any liquid fuel.

If the feature of the main valve closing and remaining closed upon roll-over of the vehicle is not required, then if desired the spring 72 can be eliminated and a float utilized having a specific gravity less than that of the liquid fuel with which it is used to provide a sufficient buoyancy force to directly close the main and pilot valves 50 & 54 when the float is partially immersed in the liquid fuel.

Operation

Typically, to fill an at least partially empty vehicle tank with a liquid fuel such as gasoline, gasahol or diesel fuel oil, a dispensing nozzle with an automatic shut-off of a station fuel pump is inserted into the inlet of the fill pipe 20 and the nozzle valve is manually opened to discharge liquid fuel through the fill pipe 20 and into the tank 12, usually at a pressure of about 25 to 30 psi and a flow rate of 10 to 12 gallons per minute. The fuel flowing into the tank 12 produces a superatmospheric pressure in the tank 12 which forces fuel vapor through the control unit 10 and into the canister 14. The charcoal in the canister 14 absorbs the fuel vapor and discharges "cleaned" air and other gases to intake manifold 16 of the engine 18.

In an at least partially empty vehicle fuel tank 12, when the fuel level is not high enough to contact the float 56 of the control unit 10, as shown in FIG. 2, the main valve 50 is open and preferably the pilot valve 54 is also open and the float is spaced downwardly from it. Fuel vapor from the tank 12 flows through the vapor passages 38 in the side of the control unit 10 and through the main valve 50. To prevent the vapor pressure acting on the bottom of the main valve 50 from closing it, the fuel vapor flows through the pilot valve 54 into the diaphragm chamber 64 and acts on the diaphragm 60 to prevent upward displacement of the diaphragm 60 and thus, of the main valve 50 to which it is rigidly connected. This holds the main valve 50 in an open position and allows a generally free flow of vapor from the tank 12 through the outlet 42 of the control unit 10 and into the vapor canister 14.

During filling, as the level of liquid fuel in the tank 12 rises above the bottom of the control unit 10, the float 56 becomes partially submerged in fuel and moves generally vertically upward, with the rising fuel level, into sealing engagement with the seat of the pilot valve 54. At a maximum fuel level, the vertical movement of the float 56 also pushes the main valve 50 upward and into a closed position in contact with the seat of the housing 52, to prevent fuel vapor and any liquid fuel from flowing into the vapor canister through the main valve 50. With the main valve 50 and the pilot valve 54 closed, the fuel vapor is trapped in the fuel tank vapor dome 22 and the addition of any more fuel causes the fuel to rise in the fill pipe 20 until the automatic shut-off of the dispensing nozzle is actuated. Thus, the vapor remains in the tank 12 and is not released to the atmosphere and the desired volume of vapor or gases in the vapor dome 22 is maintained.

After the fuel level decreases such that the fuel is no longer in contact with the float 56, the float 56 moves downward, with the decreasing fuel level, and disengages from the main valve 50 to open the pilot valve 54. The vapor pressure acting across the bottom of the main valve 50 that tends to hold it closed is counteracted by the vapor that passes through the pilot valve 54 to the diaphragm chamber 64 and acts on the diaphragm 60 and hence the main valve 50, thereby permitting the main valve to open by gravity acting on it. Thus, the main valve 50 rapidly opens so that fuel vapor can flow through the control unit 10 and into the canister 14.

When the main valve 50 and pilot valve 54 are open and the engine 18 is operating, vapor will be removed from the canister 14 and drawn into the intake manifold 16 of the engine 18 where the fuel vapor will be mixed with intake air and supplied to the cylinders of the operating engine 18. This may also produce a sufficient vacuum or a sufficiently subatmospheric pressure in the canister 14 that fuel vapor in the fuel tank 12 will flow through the control unit 10 and into the canister 14. This subatmospheric pressure on the vapor canister 14 would also tend to close the main valve 50, but it is counterbalanced by the vapor pressure in the chamber 64 that tends to move the diaphragm 60 downward, holding the main valve 50 open.

Typically, when the engine 18 is shut-off and the main valve 50 is completely open, fuel vapor will flow from the tank 12, through the control unit 10 and into the canister 14 when the pressure in the tank is greater than atmospheric pressure by as little as about one inch to three inches of water pressure or about 0.004 to 0.1 pounds per inch square. Thus, the canister 14 and the unit 10 provides negligible resistance to the flow of fuel vapor from the tank 12 whenever the main valve 50 is open.

I claim:

1. A fuel filing and vapor control apparatus for a vehicle fuel tank for containing volatile hydrocarbon fuel which comprises:
   a housing constructed to be received in a vehicle fuel tank adjacent the top of the tank, an outlet passage in the housing in communication with the fuel tank and constructed to be in communication with a vapor receiving canister to allow fuel vapor to flow from the tank to the canister, a main valve moveable to open and closed positions to control the vapor flow to the canister, a pilot valve carried by the main valve, a float moveable to open and close both the main valve and the pilot valve, a diaphragm carried by the housing and defining a chamber, a stem that operably interconnects the diaphragm to the main valve, a control passage through the stem which communicates the pilot valve with the chamber, and said main valve, pilot valve, diaphragm and float are constructed and arranged so that said main valve is open regardless of the pressure of gaseous fuel vapor in the tank so long as said float is not disposed in liquid fuel in the fuel tank and said float when immersed in sufficient liquid fuel in the tank closes both said pilot and main valves.

2. The apparatus of claim 1 which also comprises a vent carried by said stem and communicating said control passage with said outlet passage downstream of said pilot valve and said main valve, said vent being substantially smaller in size than said pilot valve.

3. The apparatus of claim 1 wherein the pilot valve has a seat carried by said main valve and the float has a closure engagable with the seat of the pilot valve.

4. The apparatus of claim 1 wherein said housing has an annular depending skirt, the float is slidably received in said skirt, and a retainer which overlaps the space between said float and said skirt.

5. The apparatus of claim 4 wherein said skirt has a plurality of longitudinal grooves or flutes spaced about its inside perimeter to allow fuel vapor to flow between said float and said skirt.

6. The apparatus of claim 4 wherein the float has a specific gravity in the range of about 0.9 to 1.4.

7. The apparatus of claim 6 which also comprises a spring yieldably biasing the float toward the closed positions of both the pilot valve and the main valve with a force produced by the spring which is small enough so that both the pilot and main valves remain open when the float is not disposed in any liquid fuel and is large enough so that the force produced by the spring plus the buoyancy of the float when it is immersed in liquid fuel will be sufficient to close both the pilot and main valves, and said spring is received within said skirt and disposed between said float and said retainer and bears on them.

8. The apparatus of claim 1 wherein said housing has at least one vapor passage in its side wall adjacent the top of the fuel tank.

9. The apparatus of claim 8 wherein each said vapor passage in the housing is located below said main valve to prevent liquid fuel from entering the housing above said main valve.

10. The apparatus of claim 1 wherein the float has a specific gravity in the range of about 0.9 to 1.4.

11. The apparatus of claim 10 which also comprises a spring yieldably biasing the float toward the closed positions of both the pilot valve and the main valve with a force produced by the spring which is small enough so that both the pilot and main valves remain open when the float is not disposed in any liquid fuel and is large enough so that the force produced by the spring plus the buoyancy of the float when it is immersed in liquid fuel will be sufficient to close both the pilot and main valves.

12. The apparatus of claim 1 which also comprises a spring yieldably biasing the float toward the closed positions of both the pilot valve and the main valve with a force produced by the spring which is small enough so that both the pilot and main valves remain open when the float is not disposed in any liquid fuel and is large enough so that the force produced by the spring plus the buoyancy of the float when it is immersed in liquid fuel will be sufficient to close both the pilot and main valves.

13. A vapor control valve assembly for a fuel tank for containing volatile hydrocarbon liquid fuel which comprises: a housing constructed to be received in a fuel tank immediately adjacent the top of the tank, an outlet passage in the housing in communication with the interior of the fuel tank and constructed to communicate with the exterior of the tank, a main valve movable to open and closed positions to control the flow of fuel vapor from the interior of the tank though the outlet passage of the tank, a diaphragm carried by the housing and defining a chamber, the diaphragm and the main valve being operably interconnected, the non-chamber side of the diaphragm and one side of the valve communicating with the outlet passage, the other side of the main valve communicating with the interior of the tank, a pilot valve communicating with the diaphragm chamber, a float movable to open and close both the main valve and the pilot valve, and said main valve, pilot valve, diaphragm and float are constructed and arranged so that said main valve is open regardless of the pressure of gaseous fuel vapor in the tank so long as said float is not disposed in liquid fuel in the fuel tank and said float when immersed in sufficient liquid fuel in the tank closes both said pilot and main valves.

14. The apparatus of claim 13 which also comprises an annular skirt encircling the main valve and the float and depending from the housing, the float having a portion received in the skirt with a relatively close sliding fit with the interior of the skirt to prevent the flow of sloshing fuel in the tank past the float and through the main valve when it is open.

15. The apparatus of claim 14 which also comprises a retainer adjacent the bottom of the skirt and overlying the space between the float and the interior of the skirt to prevent the flow of sloshing fuel in the tank past the float and into the main valve when open.

16. The apparatus of claim 15 which also comprises an annular surface adjacent the bottom of the float which is engagable with the retainer when the float is not submerged in any liquid fuel to provide a seal between the retainer and the float.

17. The apparatus of claim 14 wherein the float has a specific gravity in the range of about 0.9 to 1.4.

18. The apparatus of claim 17 which also comprises a spring yieldably biasing the float toward the closed positions of both the pilot valve and the main valve with a force produced by the spring which is small enough so that both the pilot and main valves remain open when the float is not disposed in any liquid fuel and is large enough so that the force produced by the spring plus the buoyancy of the float when it is immersed in liquid fuel will be sufficient to close both the pilot and main valves.

19. The apparatus of claim 17 which also comprises a spring yieldably biasing the float toward the closed positions of both the pilot valve and the main valve with a force produced by the spring which is small enough so that both the pilot and main valves remain open when the float is not disposed in any liquid fuel and is large enough so that the force produced by the spring plus the buoyancy of the float when it is immersed in liquid fuel will be sufficient to close both the pilot and main valves, a retainer adjacent the bottom of the skirt and overlying the space between the float and the skirt to prevent the flow of sloshing fuel in the tank past the float and into the main valve when open, and said spring is received within the skirt and disposed between said float and said retainer and bears on them.

20. The apparatus of claim 13 wherein the float has a specific gravity in the range of about 0.9 to 1.4.

21. The apparatus of claim 20 which also comprises a spring yieldably biasing the float toward the closed positions of both the pilot valve and the main valve with a force produced by the spring which is small enough so that both the pilot and main valves remain open when the float is not disposed in any liquid fuel and is large enough so that the force produced by the spring plus the buoyancy of the float when it is immersed in liquid fuel will be sufficient to close both the pilot and main valves.

22. The apparatus of claim 13 which also comprises a spring yieldably biasing the float toward the closed positions of both the pilot valve and the main valve with a force produced by the spring which is small enough so that both the pilot and main valves remain open when the float is not disposed in any liquid fuel and is large enough so that the force produced by the spring plus the buoyancy of the float when it is immersed in liquid fuel will be sufficient to close both the pilot and main valves.

* * * * *